4 Sheets—Sheet 1.
6618X
E. M. CONVERSE.
MANUFACTURE OF WARES FROM TINNED PLATE, BRASS, COPPER, OR SHEET IRON.
Patented July 20, 1831.
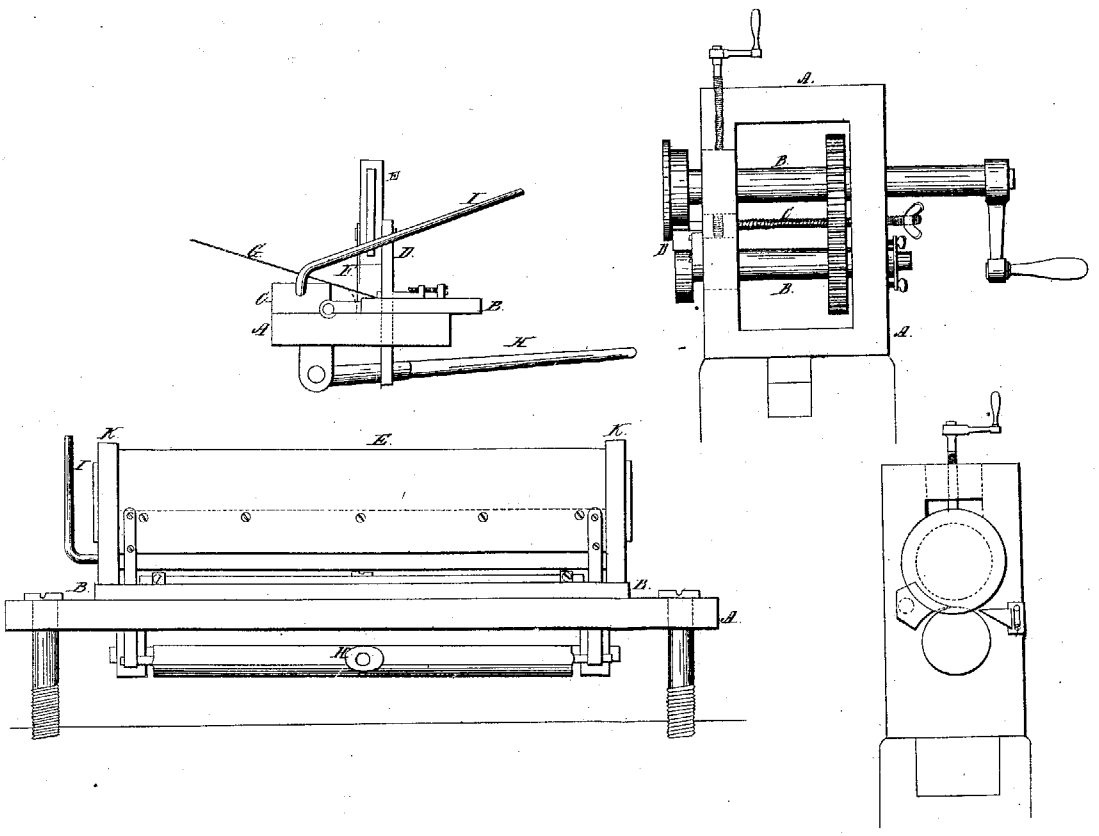

4 Sheets—Sheet 2.
6618X
E. M. CONVERSE.
MANUFACTURE OF WARES FROM TINNED PLATE, BRASS, COPPER, OR SHEET IRON.
Patented July 20, 1831.
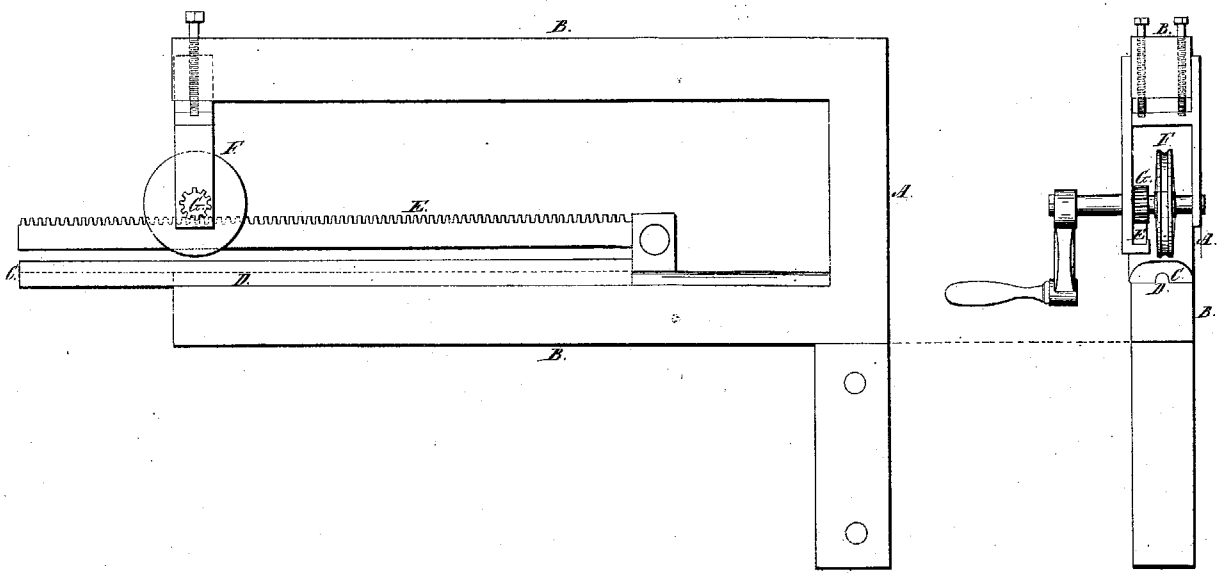

4 Sheets—Sheet 3.
6618X
E. M. CONVERSE.
MANUFACTURE OF WARES FROM TINNED PLATE, BRASS, COPPER, OR SHEET IRON.
Patented July 20, 1831.
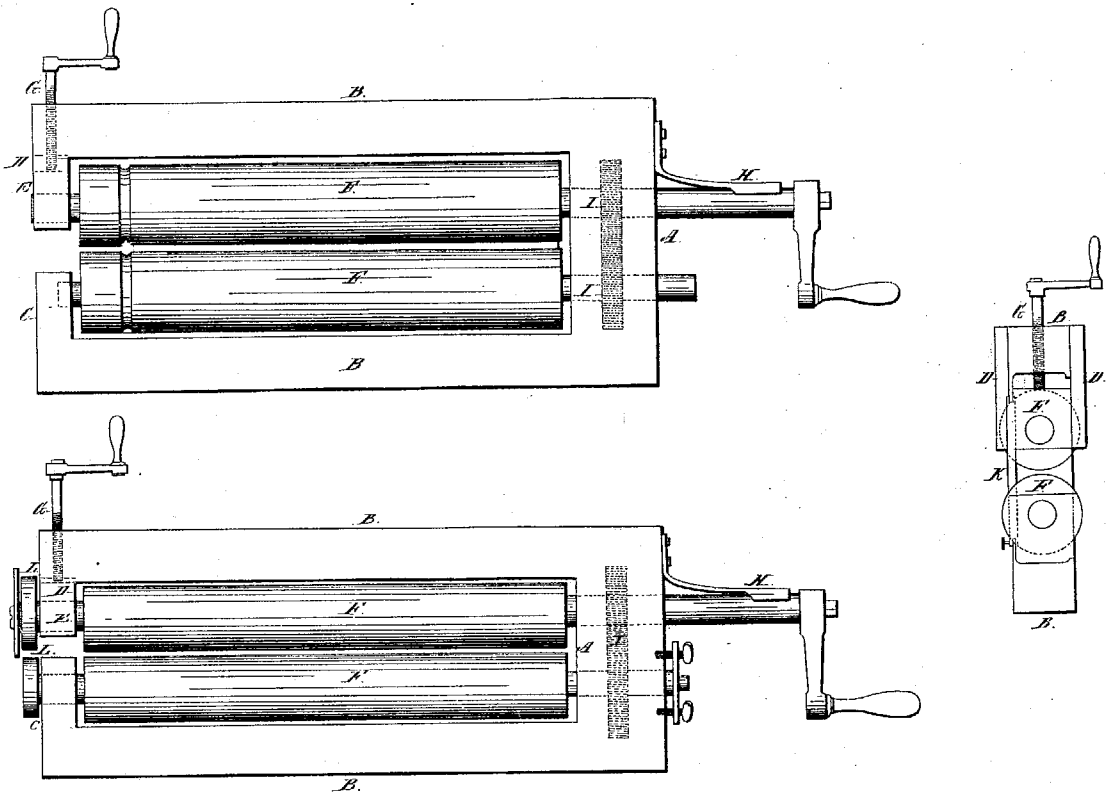

6618X
E. M. CONVERSE.
MANUFACTURE OF WARES FROM TINNED PLATE, BRASS, COPPER, OR SHEET IRON.
Patented July 20, 1831.
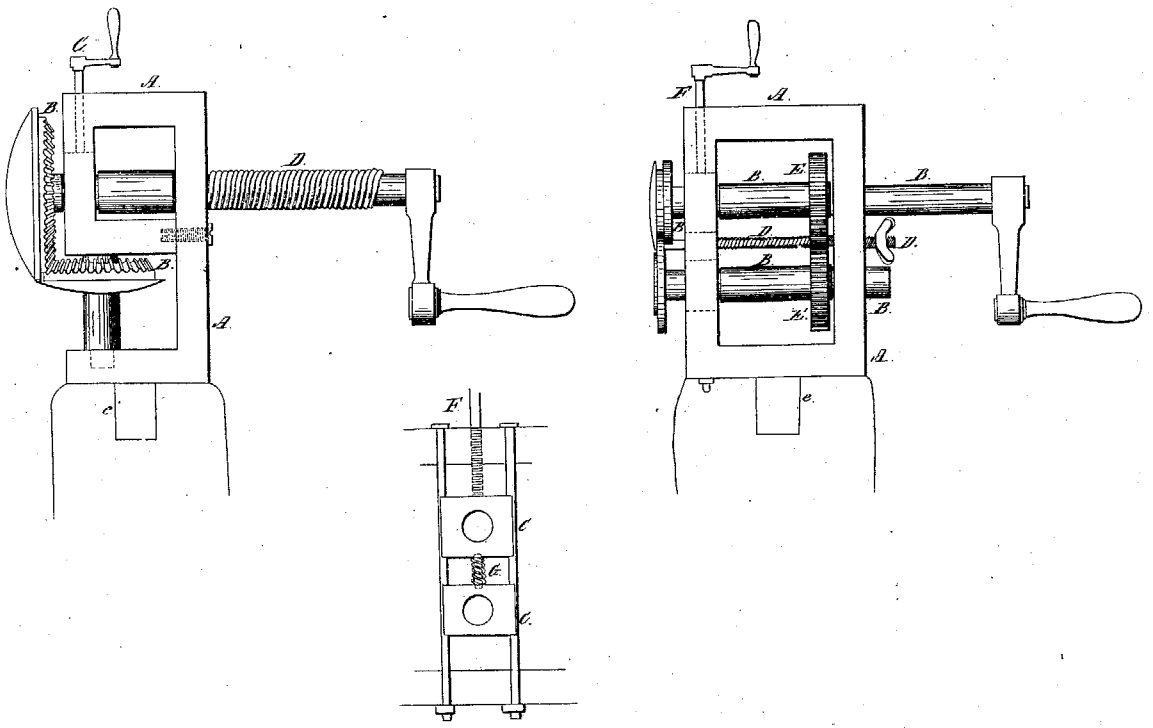

Edward M. Converse
Letters Patent dated July 20. 1831

The schedule, referred to in these Letters Patent and making part of the same containing a description in the words of the said Edward M. Converse himself of his improvement in the mode of constructing machinery for the manufacture of wares from tinned plates, sheet iron, brass or copper.

To all to whom these presents shall come. Know ye that I Edward M. Converse of Southington in Hartford County, and State of Connecticut have invented constructed made and applied to use a new and useful improvement in the mode of constructing machinery for the manufacture of wares from tinned plates, sheet iron, brass or copper described & specified in the words following viz). My improvements in the folding machine or the machine for turning straight edges consist in the following mentioned particulars (viz) in a cheaper and more simple construction of the machine and in performing the work more perfectly and expeditiously. My improved machine for turning straight edges is constructed as follows. The bed or platform is of cast iron about two feet long, six inches wide and one inch thick. on the under side of this are two projections for the purpose of receiving the pivots of the lever or T. hereafter to be described. one of these projections is cast solid with the platform. the other is attached to the platform by screws. these projections are sufficiently deep to admit the proper motion of the lever or T. To the upper surface of the platform is secured by screws a straight bar of cast iron eighteen inches long, four inches wide, and about half an inch thick. This bar is so placed as to bring the front or operating upper angle thereof, over the middle of the platform. This angle is filed true & to a perfect right angle, because
was over this angle the first part of the turn or lock is given to the
edge of the substance to be operated upon. This bar may be faced
with a plate of hammered iron or steel and this is the pre
ferable mode because thereby a better and more durable
angle is obtained: from the upper surface and at each end
of this bar and cast solid with it arise two uprights or studs
for the purpose of receiving and ~~[illegible]~~ regulating the stock for
the steel plate hereafter mentioned and described. These
upright studs are of sufficient height and strength to keep
the motion of the plate stock steady and regular. The
plate stock is of cast iron being a straight flat bar
about eighteen inches long, three and a half inches wide
and about three quarters of an inch thick the ends are cast
with a <u>rivet</u> for the purpose of being received by the uprights
or studs and kept to a steady up and down motion. The
under edge of the plate stock is also cast with a straight
rivet of sufficient width to receive & hold firmly by means
of screws the plate of steel which is to be attached to it
for the purpose of giving the turn or lock to the subject
to be operated upon. This plate of steel is of equal length
with the plate stock except the rivets at its ends and is
about two inches wide. it is well fitted to the straight rivit
on the plate stock & firmly secured thereto by screws. The
lower edge of the steel plate projects below the stock about
half an inch. this edge is filed straight and true.
The necessary motion is given to the plate stock by
means of the lever or T. operating on its pivots in ~~the~~ projec
tions under the platform. The part of the T or lever
corresponding with the upper mark of ~~the~~ letter T. ~~has~~
a pivot on each of its ends entering holes in the projections
on the under side of the platform. The plate stock is con-
nected to this part of the lever or T by means of two
iron straps or stirrups, the upper ends of which are
attached attached by screws to the back side of the plate stock - these
straps or stirrups pass down through holes in the flat bar
and platform. and their lower ends are attached to the
lever or "T" by means of a hinge operating as a hook and thim-
ble. The part of the lever or T to which the stirrups are attach-
-ed must lie somewhat back of the axis of the pivots. so as
to give the necessary motion to the plate stock. when the
handle or lever part of the T. is raised or depressed. By
this means when the lever of the T is raised the plate stock
and its steel plate are carried up by means of the strap
or stirrups.— When the lever of the T is depressed the
plate stock and plate are brought down in such manner
as to give the first turn to the edge of the substance to be
operated upon. The second and final turn of the lock is
effected by means of a flat bar of cast iron of equal length
with the plate stock. This bar is about two inches wide
and one inch thick. having pivots at each end, these piv-
ots project from the lower corner of the bar in such
manner as to have their centres in a line with the lower
inner angle of the bar. These pivots enter into iron boxes which are
attached to the ends of the straight bar by means of
screws. the boxes project in front of the straight bar far
enough to receive the pivots. That angle of the flat bar
from which the pivots project is also filed true and square
To one end of the flat bar is attached a lever or handle
so turned as to extend back in the same direction as
the handle of the T. By this handle or lever motion
is given to the flat bar, This handle being raised the
flat bar lies upon the platform. The lever of the T being
also raised the plate stock and steel plate are raised so as
to admit the edge of the material to be operated upon
into the machine (the width of the lock being regulated
by the gauge hereafter described). The lever of the T is then then brought down this motion brings the steel plate down past the operating angle for the straight bar. this gives the first turn to the fold or lock. the handle or lever of the flat bar is then brought down, this motion turns up the flat bar bringing up with it the substance to be operated upon, there by giving the second and final turn of the fold or lock. The handle of the flat bar is then raised. the lever of the T. is then raised & the thing operated upon is released from the machine.

The width of the fold or lock is regulated by a movable gauge made of a plate of hammered iron. This gauge lies flat upon the upper surface of the straight bar and is kept in place by means of a screw passing through a mortise in the centre of the gauge. the mortise is made larger than the screw pin so as to admit of sufficient motion to the gauge. The head of the screw rests on a button of bapa iron which covers the mortise. This button is not attached to the gauge, The gauge is advanced or brought back by means of two screws one operating at each end of the gauge. These screws lie horizontally passing through female screws or nuts which are placed or made in projections rising from the upper side of the straight bar and entering female screws or nuts which are made in projections at each end of the gauge. The parts of the screw pins next to the heads of the screws are cut to the right the other part next to the point of the screw pins is cut to the left. so that by turning the screws to the right the gauge is carried forward (and so vice versa. When the gauge is carried forward the width of the fold or lock is diminished and when brought back, the width is increased.

This machine is affixed to the bench by means of bolts passing through the platform & the bench. The platform must be sufficiently above the bench to give the necessary room for the motion of the lever of the T. [illegible] [illegible]

ments in this machine consist further in the method of discharg-
ing the work from the machine, the cheapness and permanency
of its construction in the superiority in the manner of finish of
the work & also the increased expedition of the operation.
My improved grooving Machine is constructed as follows,
viz. The frame is of cast iron (and) is cast solid consisting
of an upright pillar about eight inches in length with a
horizontal arm at each end of the pillar, extending from it
at right angles forming together three sides of an oblong
square these arms are two feet in length and about two
inches thick, the pillar and upper arm are square except
the corners of the upper arm are a little chamfered off. The
upper surface of the under arm is flat and true except a rib or
[illegible] in the centre of that surface extending the whole length of
it. This rib or [illegible] is a half oval and [illegible] about half
an inch & is cast solid with the frame. The object of this rib or
[illegible] is to fit & fill the groove made in a moveable bed piece
of cast iron hereafter described. The bed piece is about two feet
long being straight and flat upon its under surface except
a groove extending its whole length fitted to receive the rib on the
lower arm. The upper side of the bed-piece except at the end
which is to be placed next to the upright pillar of the frame
is shaped to a flattened half round, leaving however on
the top a plane of about half an inch wide. Upon this
bed the seam to be grooved is placed. At the end of the bed
piece next to the pillar of the frame is a knob or projection
rising on the right hand side for the purpose of sustaining
the end of the ratchet bar. The ratchet bar is straight
and of equal length with the bed having teeth or cogs on its
upper surface or side. The end of the ratchet bar which rests
upon the knob of the bed, has also a knob or projection exten-
ding a little down from the lower surface or side. At these
knobs the ratchet bar and the bed are confined together
with with a screw in such manner that the ratchet bar extends a-
long over the right side of the bed. To the end of the upper arm
of the frame is attached by screws a small frame or stand con-
taining boxes to regulate the motion and pressure of the
grooved roller hereafter described. This frame or stand is fix-
ed to the under side of the upper arm of the stand. A grooved
roller about three inches in diameter & about three quarters
of an inch thick is placed in this stand. This roller is so
placed as to lie directly over the upper surface of the bed.
To the right side of the roller and on its arbor is attached
a small cog wheel with teeth or cogs fitted to mesh with
the cogs on the ratchet bar. Through this cog wheel and the
roller passes an arbor turned by a hand crank. The arbor is
placed in movable boxes contained in the stand. These
boxes are governed by screws in the top of the stand regulat-
ing the pressure of the grooved roller upon the bed. When
the work is to be grooved turn the crank so as to bring out
the ratchet bar and the bed which move together; lay
the edge of the work on the bed immediately under the groo-
ved roller, then turn the crank forward. This moves back
the bed the work lying upon it; the grooved roller passes
over the work, the crank is then turned backward which
motion carries forward the ratchet, the bed and the work pas-
sing again under the grooved roller is discharged from
the machine & the operation is completed. This machine
is confined to the block by means of a tenon or projection from
the bottom of the stand under the pillar & lower arm this
tenon is cast solid with the frame having a hole or holes to
bolt through to the wood. The right side box through
which the arbor passes comes down so as to embrace the ratch-
et bar keeping it in its place. No brass work is required
for this machine except the small cog wheel; it performs its
work in a better manner than any other machine used for the same purpose. If it be desirable to lay the groove on the upper or outer side of the work nothing more is necessary than to substitute another bed with a groove on its upper surface and a plain roller without a groove. I claim as my invention the moveable bed of this machine and the plan of keeping that part of the work to be operated upon under the direct pressure of the roller without any spring or bending in the the ratchet bar. My improved machine for beading Stove Beading Stove Pipe pipe and articles of tinned or copper wares is constructed in manner following. A stand or frame of cast iron the whole cast solid having an upright pillar six inches in length three inches wide, about two inches in thickness with two horizontal projecting arms eighteen inches long and of sufficient size and thickness to withstand the necessary pressure of the operation. At the end of the lower arm rises a stud for the purpose of receiving in a socket the arbor of the lower cylinder; this stud is cast solid with the frame & rises from the upper surface of the lower arm sufficiently high to free the roller or cylinder from contact with the lower arm To the end of the upper arm is fixed by means of screws a cast iron stand with two projecting studs champered on their insides to receive and hold a movable box. against this box the arbor of the upper cylinder or roller rests & is regulated by it in this manner. A space is left open on that side of the stand permitting the insertion of the articles to be beaded between the cylinders and within the frame or stand. Through the upper part of this stand for the boxes is inserted a crank [illegible] which operates upon the box so as to depress at pleasure that end of the upper cylinder. That end of the upper cylinder is kept in place by means of a spring at the other end, as hereafter described. The arbors of the cylinders or rollers at their opposite ends (that is) the ones next to the upright part of the stand or frame. pass through holes in the upright pillar pillar of the frame having on these arbors & within the pillar, brass
or iron cog wheels so fitted as to mesh accurately together. The arbor
of the upper cylinder extends out five or six inches to receive a han
crank by which motion is given to the cylinders. A small spring
† is fitted on to the outside of the upright pillar extending out with
a proper curve or angle so as to bear upon the long arbor near the
part on which the crank is fixed with sufficient force to keep
to its place (under the box) the other end of the upper cylinder.
The inner surfaces of the horizontal arms of this machine should
be somewhat hollowed so as to admit the more room for the
rollers or cylinders within the frame. The pattern of the bead
is turned near the end of the cylinders farthest from the up-
right pillar of the frame, Upon the right hand of the horizontal
arms of the frame are edges projecting a little, the one upwards
& the other downwards & extending from near the pillar to
the bead pattern on the rollers. Between these projections is
placed a perpendicular iron gauge with a groove in each
end fitted to the projections on the arms. This gauge is move
able backward and forward to regulate the distance to which the
article to be beaded is admitted into the machine & to keep the
article steady in place. This gauge is secured & regulated in
place by means of a screw passing through the lip of the lower
groove of the gauge & resting its end against the projection
on the lower arm of the frame. I claim by way of improvement
on this machine the manner of constructing the frame or stand.
the principle of admitting the work to be grooved within the frame
of the machine, the manner of constructing the gauge and the
facility, and exactness of the operation. My machine for dou
ble seaming the bottoms of round or oval vessels is ~~constructed~~
in the frame or stand of the beading machine or one nearly sim
ilar to it, all the parts are similar in both except the con
struction of the cylinders or rollers and the gauge which is
not needed in the double seaming machine, having other
spout part is retained and another set or pair of cylinders introduced to go
on with the addition of a regulator for the under cylinder to be
hereafter described. The under cylinder of this machine is of iron
with a roller of case hardened iron on the end farthest from the pillar
or upright part of the frame. This roller is about two inches in di-
ameter & half an inch thick turned to a true face and plain sur-
face upon the outer circumference. This roller lies without the
body of the frame. The upper cylinder is furnished on the same end
with a roller of case hardened iron or steel two and a half inches
in diameter. The outer rim of this upper roller is grooved all a-
round in a slanting direction for the purpose of drawing the vessel to
be double seamed close to the work. & so to prevent a vacancy ne
near the end of the operation. The upper roller operates exactly above
the under roller & is forced & held down by the crank screw before
described. To the face of the upper roller is attached by a screw
made upon the projection of the arbor, a plate of hardened steel
which projects about a quarter of an inch beyond the upper
roller. The effect of this projection is to force down to a double seam
the projecting edge of the bottoms put together in the common meth-
od & this force is applied by the rim or projection formed by the
face. Motion is given to the cylinders by the same described
hand crank. A similar pair of cog wheels is applied to the
cylinders to give the corresponding motion of the cylinders, but
the upper roller being considerably larger than the under one
produces an accelerated motion in the upper roller. this is neces
sary to the operation for if both rollers were to move together with
equal velocity the work at near the end of the operation would
be left imperfect. For the purpose of keeping the lower cylin
der in place there is attached to the outside of the pillar
of the frame a regulator constructed and applied as follows.
The arbor of the cylinder projecting through the pillar about
three quarters of an inch, a channel or groove is cut
around this projection of the arbor. A small plate of steel is fitted to this channel or groove secured to the pillar by a screw
at each end of the steel plate. as these screws are turned more or
less the lower cylinder is carried out & kept to the work. that
is to increase the pressure on the outer circle of the upper roller.
In the process of double seaming - the vessel to be operated upon
is placed with the mouth toward the crank bringing the seam
of the bottom between the rollers. The crank screw is turned
down. the crank handle then put in motion & turned until
the vessel is brought quite (around. The ~~crank~~ screw is then
turned back and the vessel released the operation being)
completed. I claim the entire invention of this Machine.

Setting down machine

My improved machine for setting down bottoms on vessels of
tinned and other wares is constructed as follows. The stand is
of cast iron with a foot piece about two and a half by three inches
square and about [illegible] three quarters of an inch thick.
From this rises a back piece about three inches wide being of
equal width with the foot piece. This back piece rises
about five inches. a top piece or plate is also cast solid
with these pieces and projects in length equal to the length
of the foot piece, these forming together three sides of an oblong
square. another piece of cast iron is also made to form the
front part of the frame. This part being designed to contain the
boxes for regulating the upper roller of the machine. This
part is cast solid with an intermediate plate turning
at right angles & coming back to meet the back piece
at about the middle of its height. The crank and screw
are the same as in ~~the~~ common ~~setting down machine~~. The
horizontal roller is kept in place by a strong spiral
spring wound upon ~~that~~ part of ~~the~~ ~~arbor~~ ~~which extends~~
through the backplate & confined at one end by the stand
at the other by the hand crank of the machine. The foot of the ar-
bor in my machine is a round pivot with a shoulder the
pivot entering a hole in the bottom plate & the shoulder rest-
ing ing in the plate. This plan is better than the common way
of constructing this part of the machine. Upon my plan of con
structing this machine as well as all the other stand machines
the top plate is cast solid with the back part of the stand
& thereby one pair of screws is saved. The middle plate is
secured to the back plate by means of a screw or screws. —
The common method of securing the cap plate to the stands
is to cast into the stand screw pins which pass through
the top plate & receive nuts to hold it in place. My improve-
ment on this part of stand machines is to secure the cap or top
plate by screws passing through the top plate & entering the
stands. This improvement renders the machine more secure
& more convenient. I claim also the invention & improvement
of the spiral spring on the arbor of the setting down machine. in
the stand of this machine as well as the stands of the other
machines at the bottom of the stand & cast solid with the stand
is a tenon about two inches deep extending the length of
the bottom & perforated with holes for the purpose of confin
ing the stands firmly to their blocks. This I also claim
as my invention. The stand of this machine as well as the
stands of all the machines may be cast entirely solid
as specified in the next mentioned machine. viz. the
machine for turning edges to receive the wire — turning edges
This machine for turning said edges according to my improve
ment is constructed as follows. The stand is of the usual dimen
sions viz. about 9 inches high and about four inches in width
the whole cast solid with the ~~tenon~~ on the bottom for con
fining it to the block. the back part of the stand is solid
except ~~two~~ holes for the arbors ~~of the~~ rollers, these ~~arbors in~~
~~the~~ holes without boxes. the top plate is cast solid with the
stand. there is an opening left in the front plate extending
the whole height, this opening is for the purpose of the receiv-
ing the boxes for the arbors of the rollers at that end of the machine.
The the boxes are kept in place by means of an iron rod on each side
of the boxes. these rods pass down through the top plate & into the
bottom plate of the machine, having a screw cut at their lower
ends, these rods fill the grooves cut in the ends of the boxes & keep
them in place. The boxes (may) be made of brass, composition
metal or cast iron. The gauge for this machine has a shank
or rod passing through the front & back plates of the stand & hav-
ing a spiral spring wound on the whole length between the
parts of the stand. This rod comes through the back plate of the
stand about half an inch having a screw cut upon that end
about an inch and a half in length so as to receive on the in-
side of the back plate a nut with short arms like a windlass. The
spiral spring presses against this nut to keep it in place. -
By turning this nut is carried forward & brought back at pleas
ure under the operation of the spring. The rollers are supplied
with cog wheels & the boxes governed by a crank screw in the
in the usual manner. I claim the invention of the manner
of regulating the gauge of this machine & the manner of con
structing the stand. Between the boxes of this machine I
place a small spiral spring for the purpose of elevating the uppe
roller to receive the work previous to turning down the crank
screw. The ends of this screw (spring) are let into small holes in the
boxes. This spring is applied by me to all the machines
having boxes except the setting down machine where it is no
required. This spring I claim as my invention. The cog
wheels are put into the arbors where the stand is cast entire
by screws cut on the arbors. the one to the right & the other to
the left: female screws being cut to meet them & match
with them in the wheels. The stand of my burring machine
is constructed in the same manner as the one above described
The gauge is regulated in the same manner, as the edge of the
upper edge of the upper roller of this machine is apt to fail, I con
struct that by a face or rim of spring temper steel & secured
[illegible]

on the end of the arbor by means of screws. This face or rim is easi-
ly made & fitted to the arbor and saves the necessity of [illegible] whole
roller. In other respects this machine is constructed in the usual
manner. My improved wiring machine is constructed as [illegible]
follows. The stand is cast solid and entire — the cylinders
or rollers are put into the machine in the same manner as
the machine for turning edges: the gauge with a shank
is governed in the same manner & the under roller or cylin-
der is governed by a collar in the same manner as described
in the machine for double seaming. The cog wheels are put
on to the arbors by means of right & left screws as described before.
The boxes are raised by means of small spiral springs be-
fore described. The under roller is turned plain without a
shoulder. The outer corner however must be a little chamfer-
ed off. The upper roller is turned with a projecting edge
on the front. To this machine are two gauges viz. one with
a shank as before described. The face or acting part of this
gauge passes through between the rollers being hollowed out
on each side to a narrower neck between the rollers. The face
of this gauge is also a little hollowed to shape the wire —
The forming gauge is placed on the opposite side of the rollers
and is secured on the face of the stand by a screw and steady
pin. This gauge is made at a right angle. one angle rest-
ing on the frame by a flat side; in this part of the gauge is
a perforation or mortise. permitting the gauge to be moved
up and down The steady pin is placed above the screw,
and serves to keep the gauge steady. Below the steady
pin is a screw with a large head to cover the mortise in
that part of the gauge. This screw being turned home holds
the gauge in place — turned back, liberty to remove the
gauge up and down. The other part of this gauge stands
out at a right angle from the frame and being lowered
more or less governs the curve of the edge — By my
con construction of the rollers and gauges the wire is thrown on the outer circumference of the vessel. which is a great improvement. The construction of the frame. manner of fitting on the wheels with cogs. form, and mode of managing the gauges, and formation of the rollers, is my invention. I also claim the invention of screwing on the cranks to the arbor by means of screws. instead of putting on the cranks by means of square tenons. Machines constructed on the principles of my improvement are cheaper and more durable than any heretofore known, less liable to injury, and in many respects perform the work in a better manner. My improved composition of metals for the stands, boxes and wheels is made of two parts zinc or spelter, one part copper and one half part tin. My mode of combining these metals for my composition, is to melt together the copper & tin to which I add a quantity of zinc equal to the weight of the copper & tin. This hard compound is then added to the remaining quantity of zinc, both parcels being in a fuzed state. This composition is valuable for the purpose of making various articles. as spoons, buckles, buttons, the erect parts of andirons; heads of fire shovels. pokers and tongs, door handles and knockers, and to many of these purposes I have converted it with good success. This composition is much cheaper than copper or brass, is easily cast and kept clean, contracts no rust or oxide and receives and retains a good polish. In testimony that the above is a true specification of my said improvements as above described, I have hereunto set my hand and seal this twenty ninth day of March A.D. 1831

Witnesses

Romeo Lowrey

Joel Holcomb

[illegible] M. [illegible]

[illegible] [illegible]